United States Patent
Lake et al.

(10) Patent No.: US 10,848,600 B2
(45) Date of Patent: Nov. 24, 2020

(54) WIRELESS CONFIGURATION AND PROGRAMMING OF AUTOMOTIVE AFTERMARKET PERIPHERAL INTERFACING MODULES

(71) Applicant: AAMP of Florida, Inc., Clearwater, FL (US)

(72) Inventors: Michael Lake, Seminole, FL (US); Nathaniel Lee Wincek, New Port Richey, FL (US)

(73) Assignee: AAMP of Florida, Inc., Clearwater, FL (US)

(*) Notice: Subject to any disclaimer, the term of this patent is extended or adjusted under 35 U.S.C. 154(b) by 0 days.

(21) Appl. No.: 16/021,534

(22) Filed: Jun. 28, 2018

(65) Prior Publication Data

US 2019/0007528 A1    Jan. 3, 2019

Related U.S. Application Data

(60) Provisional application No. 62/526,419, filed on Jun. 29, 2017.

(51) Int. Cl.
*H04L 29/06* (2006.01)
*B60R 16/023* (2006.01)

(52) U.S. Cl.
CPC .............. *H04L 69/18* (2013.01); *H04L 69/08* (2013.01); *B60R 16/023* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,046,638 B1* | 5/2006 | Klausner | ............. | G05B 19/042 |
| | | | | 370/313 |
| 9,684,500 B2* | 6/2017 | Margol | .................... | G06F 8/61 |
| 2003/0139179 A1* | 7/2003 | Fuchs | .................... | G07C 5/008 |
| | | | | 455/426.1 |
| 2003/0167345 A1* | 9/2003 | Knight | .................. | H04L 12/403 |
| | | | | 709/249 |
| 2004/0249526 A1* | 12/2004 | Hauer | ..................... | G08C 17/00 |
| | | | | 701/32.7 |
| 2005/0239434 A1* | 10/2005 | Marlowe | .............. | G11B 19/025 |
| | | | | 455/345 |

(Continued)

*Primary Examiner* — Yee F Lam
(74) *Attorney, Agent, or Firm* — Michael Best & Friedrich LLP

(57) ABSTRACT

Vehicles typically include a communication system for communicating with and controlling devices and sensors installed in the vehicle. The vehicle may include a radio head unit. The head unit other devices and may provide functionality sensors installed in the for controlling vehicle. Devices and sensors installed in a vehicle may operate using incompatible communication protocols. An interface may be provided that detects the communication protocol used by a device/sensor and locates an information exchange protocol. The information exchange protocol may be executed by the interface. The information protocol may translate one communication protocol into another communication protocol. Translating communication protocols may allow two (or more) otherwise incompatible devices/sensors to work together and be integrated into a vehicle.

17 Claims, 17 Drawing Sheets

(56) References Cited

U.S. PATENT DOCUMENTS

| | | | |
|---|---|---|---|
| 2006/0045115 A1* | 3/2006 | Nix | H04L 29/06027 370/432 |
| 2007/0015486 A1* | 1/2007 | Marlowe | G11B 19/025 455/345 |
| 2007/0038434 A1* | 2/2007 | Cvetko | B60R 11/0241 703/23 |
| 2007/0293183 A1* | 12/2007 | Marlowe | G01C 21/36 455/345 |
| 2008/0299899 A1* | 12/2008 | Wolfe | H04B 1/3805 455/15 |
| 2014/0164579 A1* | 6/2014 | Douthitt | G07C 5/008 709/219 |
| 2014/0378055 A1* | 12/2014 | Pal | H04W 76/14 455/41.2 |
| 2015/0312380 A1* | 10/2015 | Sauerbrey | H04L 69/18 455/426.1 |
| 2018/0339662 A1* | 11/2018 | Wincek | B60R 11/0211 |

* cited by examiner

WIRELESS CONFIGURATION AND PROGRAMMING OF AUTOMOTIVE AFTERMARKET PERIPHERAL INTERFACING MODULES

CROSS-REFERENCE TO RELATED APPLICATION

This application is a non-provisional of U.S. Provisional Patent Application No. 62/526,419 filed Jun. 29, 2017 entitled "WIRELESS CONFIGURATION AND PROGRAMMING OF AUTOMOTIVE AFTERMARKET PERIPHERAL INTERFACING MODULES" which is hereby incorporated by reference herein in its entirety.

FIELD OF TECHNOLOGY

Aspects of the disclosure relate to integration of devices in a vehicle. Specifically, aspects of the disclosure relate to integrating devices that have mismatched or incompatible communication protocols.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1A:
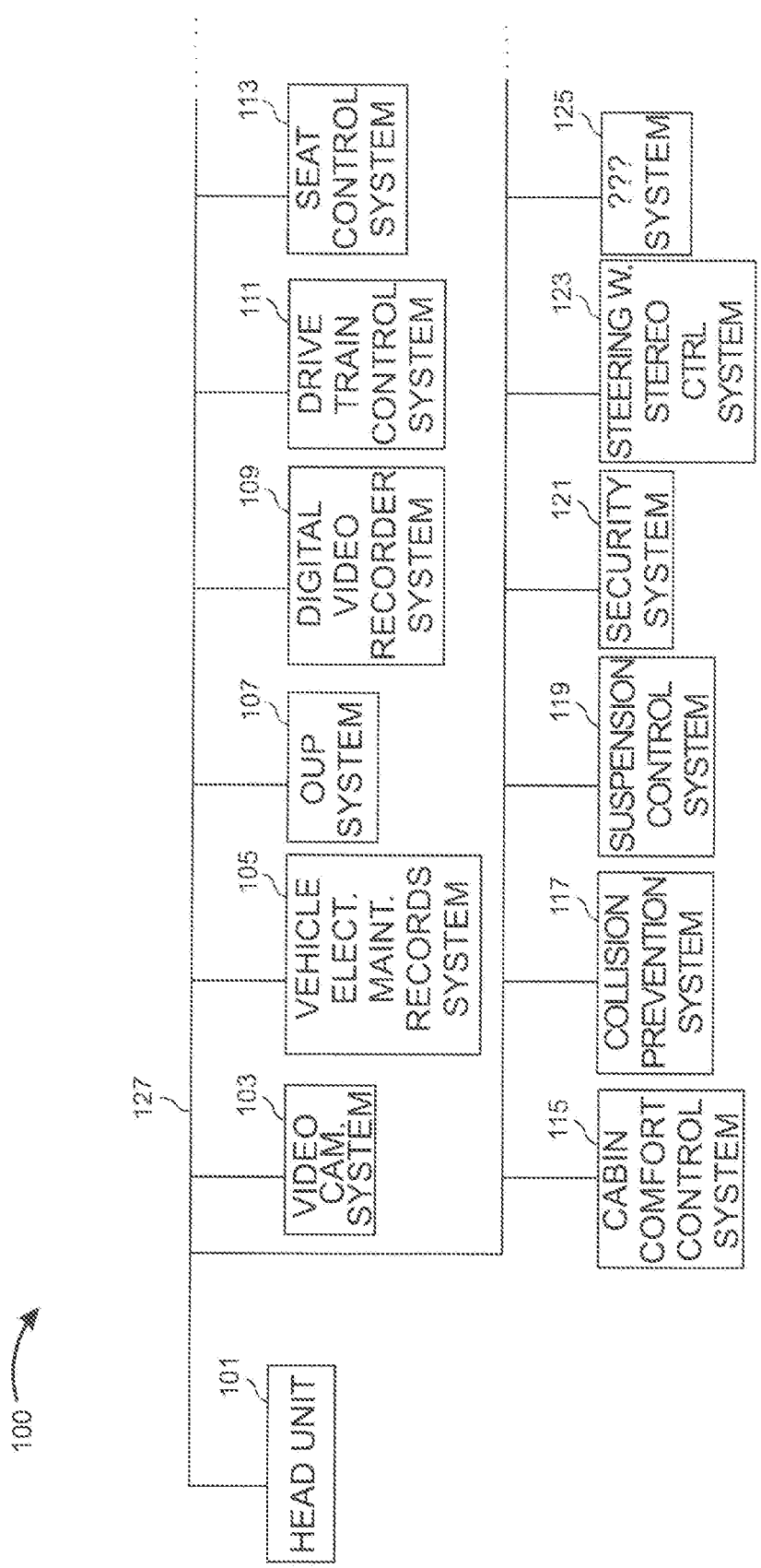
FIG. 1A shows illustrative apparatus in accordance with principles of the disclosure.

Vehicles are typically provided with a communication system for communicating with and controlling devices and sensors from different vehicular systems, including passenger amenity systems. A vehicle may be any suitable vehicle. Exemplary vehicles may include a car, boat, truck, plane, construction equipment and motorcycle. A radio head unit typically includes a radio receiver, an amplifier, and a user interface by which a vehicle driver may select and adjust audio or visual entertainment signals. The interface may include a graphical user interface. The interface may include a user voice interface.

The head unit typically includes programmed logic. The head unit typically includes programmable logic. The head unit typically includes machine-readable memory. The head unit may function as a central processor. The head unit may be an OEM head unit. The head unit may be an aftermarket head unit.

The head unit typically is in communication through the communication system with peripheral processors that are typically dedicated to a vehicle device or system. A peripheral device may be an OEM peripheral device. The peripheral device may be an aftermarket peripheral device. Table 1 lists illustrative peripheral devices.

TABLE 1

| Illustrative peripheral devices. Illustrative peripheral device |
| --- |
| Video Camera System |
| Vehicle Electronic Maintenance Records System |
| Unattended Occupant Protection System ("UOPS") |
| Digital Video Recorder System |
| Drive Train Control System |
| Seat Control System |
| Cabin Comfort Control System (may control, for example, internal lighting, climate and any other suitable amenities) |
| Collision Prevention System |
| Suspension/Performance Control System |
| Security System |
| Steering Wheel Control System (for controlling peripherals from controls on steering wheel) |

When a head unit and a peripheral use communication protocols that are different from each other, the peripheral and the head unit may be unable to communicate with each other. The different protocols may be incompatible with each other.

Apparatus and methods are provided for bridging incompatibility of a head unit and one or more peripheral devices. Any suitable peripherals may be used in accordance with the principles of the disclosure. Apparatus may include an interface. The interface may include an information exchange protocol. The information exchange protocols interface, when executed by the interface, may translate between different protocols.

Apparatus may include a system for communicating with and controlling devices and sensors in a vehicle. The system may include a radio head unit. The radio head unit may be an aftermarket head unit. The radio head unit may be an original equipment manufacturer ("OEM") radio head unit.

The radio head unit may be configured to communicate using a first communication protocol. The system may include a peripheral device configured to communicate using a second communication protocol. The second protocol used by the peripheral device may be incompatible with the first communication protocol used by the head unit.

The peripheral device may include a peripheral processor that controls one or more functions of the device. The peripheral processor may be dedicated to a specific device or vehicle system. The dedicated peripheral processor may be embedded in an aftermarket component installed in the vehicle. A peripheral device may be an OEM peripheral device. The peripheral device may be an aftermarket peripheral device.

The system may include a vehicle communication system. The vehicle communication system may include a system bus or one or more non-bus communication system channels. The vehicle communication system may be configured to move data between the radio head unit and one or more peripheral devices.

The system may include a programmable interface. The programmable interface may be configured to bridge the incompatibility of the radio head unit and peripheral device. The programmable interface may provide functionality that allows the radio head unit to control a peripheral device using the vehicle communication system.

The programmable interface may include communication ports. The communication ports may allow the interface to connect and communicate with one or more vehicle components or systems. The programmable interface may include a first communication port. The first communication port may be used by the interface to communicate (receive and/or transmit data) with the radio head unit. The programmable interface may include a second communication port. The second communication port may be used by the interface to communicate (receive and/or transmit data) with a peripheral device.

The programmable interface may include a third communication port. The third communication port may be used by the interface to access and communicate (receive and/or transmit data) with a mobile device. Aside for a connection established by the interface, the mobile device may not be connected to, or accessible by, other vehicle systems. The mobile device may not be installed in the vehicle. The mobile device may be outside the vehicle.

The programmable interface may be configured to bridge incompatibility between a peripheral device and head unit without pre-programming the interface prior to installation in the vehicle. For example, the interface may be self-configurable after being installed in the vehicle. For example, after being installed in the vehicle, the interface may use the first communication port to identify the first communication protocol used by the radio head unit.

After being installed in the vehicle, the interface may use the second communication port to identify the second communication protocol used by a peripheral device. After being installed in a vehicle, the interface may use the third communication port to detect presence of the mobile device outside the vehicle.

The interface may be configured to harvest power from a battery of the vehicle to communicate with the mobile device. The interface may harvest power from the battery even if the engine of the vehicle is not running. In some embodiments, the interface may be configured to harvest power from the mobile device to communicate with the mobile device. The programmable interface may be configured to communicate with the mobile device outside the vehicle using a wired or a wireless communication channel. For example, the interface may utilize a Bluetooth or WiFi channel to communication with the mobile device. The interface may include a wireless transceiver or other hardware for communicating with the mobile device.

In response to detecting the mobile device outside the vehicle, initiate a data connection with the mobile device. Via the mobile device, the interface may gain access to a remote network. The interface may search the remote network for a target information exchange protocol. The target information exchange protocol may, when executed by the interface, translate between the first and second protocols.

The interface may download the target information exchange protocol found on the remote network. After obtaining the target information exchange protocol, the interface may disconnect from the mobile device and remote network. The interface may utilize the downloaded target information exchange protocol to bridge the incompatibility between the radio head unit and peripheral device.

For example, the interface may be configured to intercept information transmitted by the peripheral device using the second communication protocol. The interface may translate the intercepted information transmitted by the dedicated peripheral processor into the first protocol. The interface may push the information, now reformatted in the first communication protocol, onto the vehicle communication system.

The interface may be configured to intercept information transmitted by the radio head unit in the first communication protocol. The interface may translate the intercepted information transmitted by the radio head unit into the second protocol. The interface may push the information, now reformatted in the second communication, onto the vehicle communication system.

Apparatus may include a system for harmonizing communication and control of devices and sensors installed in a vehicle. The system may include a radio head unit. The radio head unit may communicate with other internal vehicle systems and/or sensors using a first communication protocol. The system may include a peripheral device that communicates with one or more other internal vehicle systems using a second communication protocol. The first and second protocols may be mismatched with each other.

Mismatched protocols may include protocols that are incompatible. For example, the peripheral device may not be able to process instructions received from the head unit formatted in the first communication protocol. The head unit may not be able to monitor status signals generated by the peripheral device in the second communication format.

The system may include an electronic communication link. The electronic communication link may carry data generated by the radio head unit to another vehicle component or sensor. The electronic communication link may carry data generated by the dedicated peripheral processor. The electronic communication link may carry data between two or more vehicle components.

The system may include a dynamically programmable interface. The interface may include a first communication port. The first communication port may monitor data traffic on the electronic communication link. The first communication port may be configured to intercept data generated by the radio head unit.

The interface may include a second communication port. The second communication port may monitor data traffic on the electronic communication link. The second communication port may be configured to intercept data generated by the dedicated peripheral processor.

The system may include an interface transceiver. The interface transceiver may provide hardware and/or software for accessing a communication network that is otherwise external to the vehicle. The interface transceiver may be removable from the interface. Using the transceiver, the interface may obtain a target information exchange protocol via the communication network. The target information exchange protocol, when executed by the interface, may bridge incompatibility of the radio head unit and dedicated peripheral processor.

The target information exchange protocol may translate intercepted data generated by the radio head unit into the second communication protocol that is used by the peripheral device. The target information exchange protocol may translate intercepted data generated by the dedicated peripheral processor into the second communication protocol.

A peripheral device may be one of a plurality of peripheral devices. The second communication protocol may be one of a plurality of second communication protocols. Each of the second communication protocols may be incompatible with the first communication protocol. Each of the plurality of second protocols may be associated with a different peripheral device installed in the vehicle.

A target information exchange may be one of a plurality of target information exchanges. The interface may be configured to obtain, from one or more networks external to the vehicle, the plurality of target information exchanges such that the interface dynamically self-configures to provide compatibility with each of the second protocols and the radio head unit.

For example, the interface may be configured to execute any one of the plurality of target information exchanges and translate data generated by any one of the plurality of peripheral devices into the first communication protocol utilized by the radio head unit. The interface may also be configured to translate data generated by the radio head unit into any one of the plurality of second communication protocols. The translating may bridge the incompatibility of radio head unit and the peripheral devices.

The interface may be configured to detect removal of the peripheral device from the vehicle. In response to detecting the removal, the interface may delete the target exchange protocol associated with the removed peripheral device. Removing the unneeded target exchange protocol may allow the interface to have a smaller memory for storing target exchange protocols. Removing the unneeded target exchange protocol may improve operation of the interface. Removing the unneeded exchange protocol may free up computational resources and thereby improve operation of needed exchange protocols.

The interface may include a third communication port. The third communication port may be used to access a mobile device outside the vehicle. The interface may be configured to harvest charge or current from the mobile device external to the vehicle. The interface may harvest enough charge to power access to a communication network accessible via the mobile device and otherwise external to the vehicle.

The interface may be configured to harvest charge or current from the mobile device to query the peripheral device and identify the second communication protocol. For example, the interface may harvest charge from the mobile device when the vehicle is not running. The interface may harvest charge or current using the transceiver.

The interface may be configured to harvest charge or current from an electrical system of the vehicle to power access to the communication network otherwise external to the vehicle. The interface may harvest charge from the vehicle whether or not the vehicle is running.

Methods for dynamically integrating, in a vehicle, an original equipment manufacturer ("OEM") head unit and an aftermarket peripheral device that is incompatible with the OEM head unit are provided. The methods may include installing an interface in the vehicle. Installing the interface may include linking the interface to a communication system of the vehicle.

Methods may include using the interface to identify a make, model and year of the vehicle. The interface may identify the make, model and year based on querying components of the vehicle accessible via the communication system. Methods may include identifying a unit model of the aftermarket peripheral device. Based on the unit model, the interface may determine a manufacturer of the aftermarket peripheral device. Based on the unit model, the interface may determine a communication protocol utilized by the aftermarket peripheral device.

Methods may include accessing a remote network. The remote network may be external to the vehicle. A network external to the vehicle may be a network that is not accessible (except via the interface) to other vehicle components via the communication system of the vehicle. Methods may include downloading software from the remote network. The software may be an information exchange protocol that reformats or translates information between two or more communication protocols. The software may be stored and executed by the interface.

The software may reformat communications generated by the OEM head unit. The interface may monitor the communication system of the vehicle for information generated by the OEM radio head unit. The software may reformat communications generated by the aftermarket peripheral device. The interface may monitor the communication system of the vehicle for information generated by the aftermarket peripheral device.

In response to detecting first information transmitted onto the communication system by the OEM head unit, the interface may execute the software and reformat the first information into a second communication protocol that is compatible with the aftermarket peripheral device. In response to detecting second information transmitted onto the communication system by the aftermarket peripheral device, the interface may execute the software to reformat the second information into a first communication protocol that is compatible with the OEM head unit.

After reformatting information the interface may push the reformatted information onto the vehicle communication system. The vehicle system may route the reformatted information to a destination identified in the information before it was intercepted by the interface.

Methods may include, using the interface, detecting a mobile device within a threshold distance of the interface. Methods may include connecting to a remote network using the mobile device. Methods may include locating a software update to the peripheral device. Methods may include downloading the software update. Methods may include installing the software update on the peripheral device.

An ability of the interface to connect to the remote network may improve the operation of a head unit and/or peripheral devices (aftermarket or OEM) installed in the vehicle by providing to access to network previously inaccessible to those components after they are installed in a vehicle. An ability of the interface to more frequently connect to the remote network may improve the operation of head unit and/or peripheral devices installed in the vehicle by providing more frequent and autonomous software updates for those components.

Methods may include using the interface, harvesting power from the mobile device to communicate with the mobile device.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Apparatus embodiments may include features that are neither shown nor described in connection with the illustrative apparatus. Features of illustrative apparatus may be combined. For example, an illustrative embodiment may include features shown in connection with another illustrative embodiment.

FIG. 1A shows illustrative arrangement 100 of components that may be installed in a vehicle. Arrangement 100 includes head unit 101. Head unit 101 is connected to vehicle communication system 127. Vehicle communication system 127 may provide communication links and protocols for transferring information between vehicle components shown in arrangement 101.

Arrangement 100 includes peripheral devices 103 (video camera system), 105 (vehicle electrical maintenance records system), 107 (unattended occupant protection system), 109 (digital video recorder system), 111 (drive train control system), 113 (seat control system), 115 (cabin comfort control system), 117 (collision prevention system), 119 (suspension control system), 121 (security system), 123 (steering wheel stereo control system), 125 (any other suitable devices).

Figure 1B:
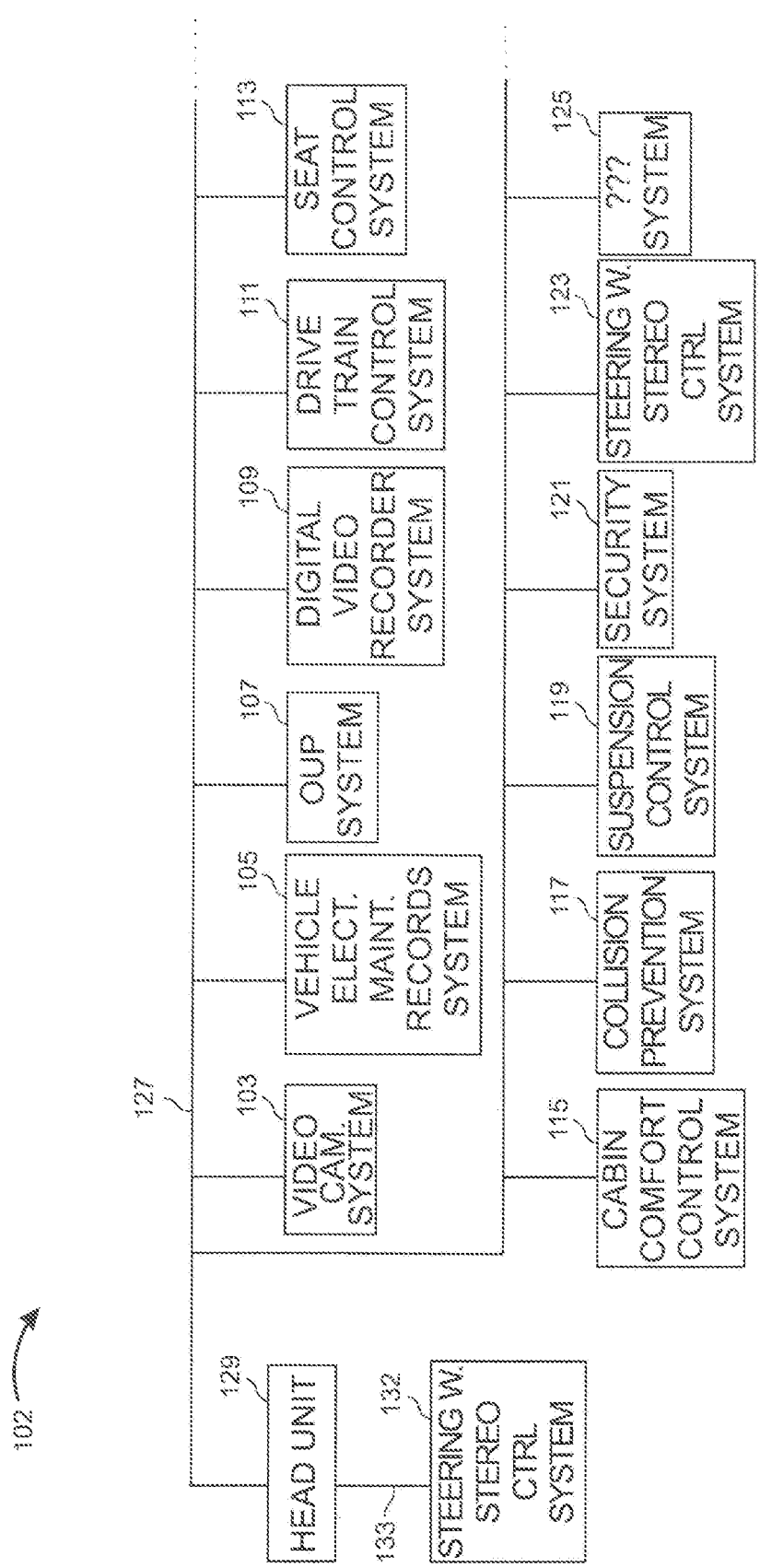
FIG. 1B shows illustrative apparatus in accordance with principles of the disclosure.

FIG. 1B shows illustrative arrangement 102 of components that may be installed in a vehicle. Arrangement 102 includes components 103-125 (shown above in FIG. 1A). Arrangement 102 includes vehicle communication system 127 (also shown above in FIG. 1A).

Arrangement 102 includes head unit 129. Head unit 129 may include one or more features of head unit 101 (shown in FIG. 1A). Arrangement 102 shows that steering wheel control module 131 is in direct communication with head unit 129 via channel 133. Steering wheel control module 131 may include one or more features of steering wheel control module 123. In some embodiments, a vehicle may only include steering wheel control module 131.

Channel 133 may be a non-bus channel vehicle communication system 127. A vehicle communication system, such as communication system 127, may include one or more interconnected channels. Table 2 lists illustrative vehicle communication system channels.

TABLE 2

Illustrative vehicle communication system channels.
Illustrative vehicle communication system channels Wire
Infrared
Wi-Fi
Bluetooth
Bluetooth-low energy
Coaxial cable
Fiber optic cable Any other suitable vehicle communication system channels may be used in accordance with the principles of the disclosure. A channel may provide communication using one or more protocols. A protocol may be a bus protocol. A vehicle may include one or more bus protocols. One or more of the peripherals may be in communication with one or more of the head unit, another peripheral and the vehicle data bus via a communication system channel. One or more of the peripherals may be in communication with one or more of the head unit and other peripherals via the vehicle data bus.

When an aftermarket ("AM") head unit or an AM peripheral device replaces an original equipment manufacturer ("OEM") head unit or an OEM peripheral device, respectively, there may be a mismatch between AM and OEM protocols. The mismatch may be overcome using an interface that translates between the protocols.

A vehicle power circuit in a vehicle electrical system typically provides operating power to head units and peripherals. Apparatus and methods are provided for a technician to communicate with the interface. The apparatus and methods may include or involve an interface device. The apparatus and methods may include or involve interface software. The apparatus and methods may include logic for controlling a peripheral. The apparatus and methods may include one or more of hardware, firmware and software for exchanging vehicle peripheral information with a peripheral. The apparatus and methods may include one or more of hardware, firmware and software for changing or updating settings of a peripheral. The apparatus and methods may include one or more of hardware, firmware and software for querying settings of a peripheral. The apparatus and methods may include one or more of hardware, firmware and software for translating between the protocols.

The apparatus and methods may include the use of a mobile communication device to communicate with an interface. The apparatus and methods may include or involve a mobile communication device application for interacting with the interface.

The mobile communication device may communicate with the interface by wired or wireless implementations. Table 3 shows illustrative examples of wireless communication implementations.

TABLE 3

Illustrative wireless communication implementations.
Illustrative wireless communication implementations Near-field communication
Infrared
Wi-Fi
Bluetooth
Bluetooth-low energy Any other suitable implementations may be used in accordance with the principles of the disclosure. Apparatus and methods may include harvesting power from the electrical system to power transmission and reception of vehicle peripheral information to and from the interface.

Tables 4-6 identify illustrative information that the mobile device may transmit to, or receive from, an interface.

Table 4 lists illustrative vehicle peripheral information.

TABLE 4

Illustrative vehicle peripheral information.
Illustrative vehicle peripheral information Peripheral make
Peripheral model
Peripheral version number
Peripheral default settings
Peripheral setting
Peripheral status Any other suitable peripheral information may be used in accordance with the principles of the disclosure.

Table 5 lists illustrative interface information.

TABLE 5

Illustrative interface information.
Illustrative interface information

Configuration settings
Firmware version information

Any other suitable interface information may be used in accordance with the principles of the disclosure.

Table 6 lists illustrative vehicle information.

TABLE 6

Illustrative vehicle information.
Illustrative vehicle information

Vehicle make
Vehicle model
Vehicle data bus serial number
Vehicle data bus controller version number Any other suitable vehicle information may be used in accordance with the principles of the disclosure.

Table 7 lists illustrative user functions that may be executed from a mobile device that is in communication with a peripheral interface.

TABLE 7

Illustrative user functions.
Illustrative user functions

Retrieve vehicle information from vehicle
Retrieve peripheral information from peripheral
Retrieve vehicle information from remote server
Retrieve peripheral information from remote server
Illustrative user functions
Download vehicle information from remote server
Download peripheral information from remote server
Install vehicle information in peripheral
Install peripheral information in peripheral
Select and display vehicle information
Select and display peripheral information
Update peripheral software Any other suitable user functions may be used in accordance with the principles of the disclosure.

Figure 2:
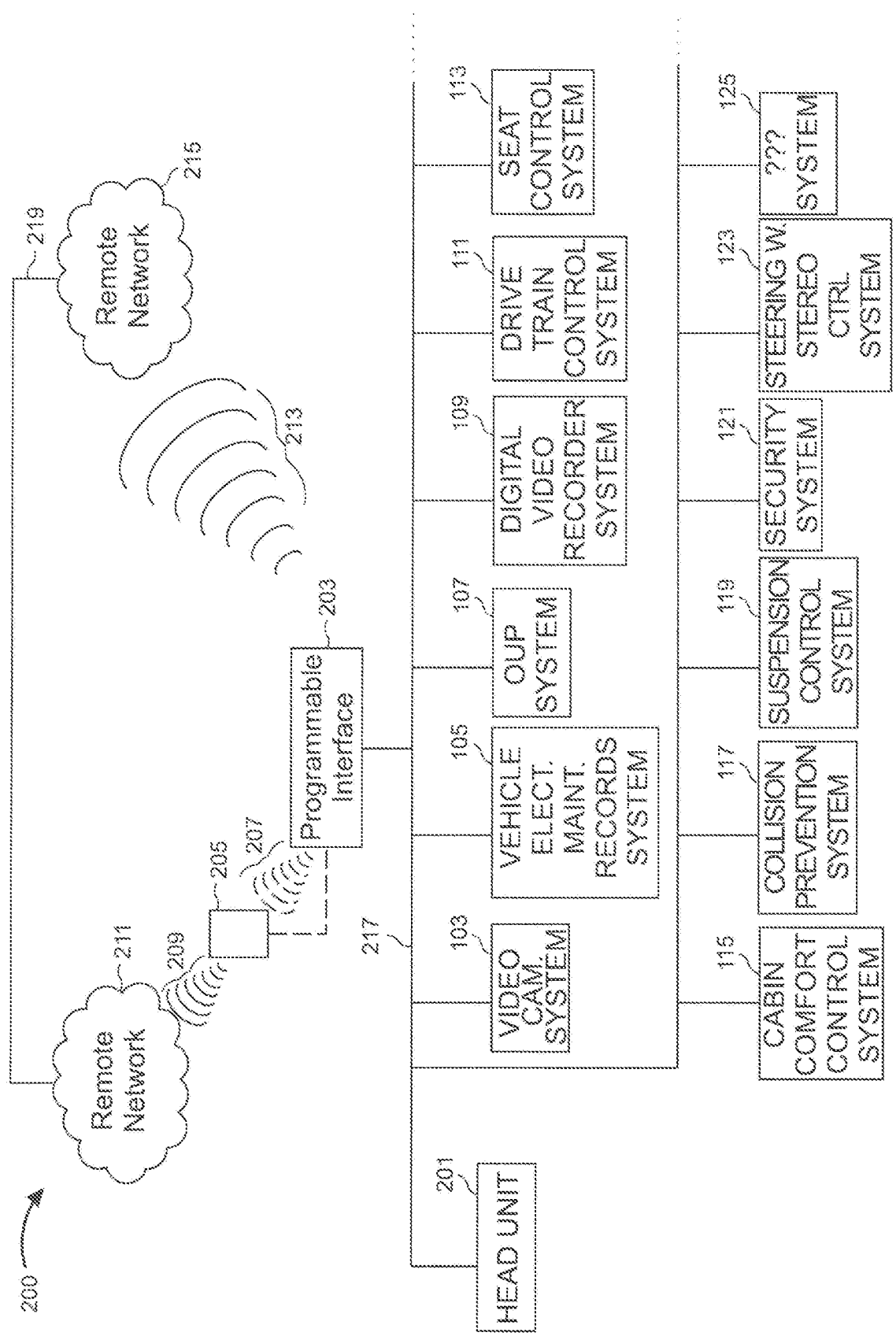
FIG. 2 shows illustrative apparatus in accordance with principles of the disclosure.

FIG. 2 shows illustrative arrangement 200. Arrangement 200 includes head unit 201. Head unit 201 may be an aftermarket head unit. Head unit 201 may be an OEM head unit. Head unit 201 may include one or more features of head unit 101 (shown in FIG. 1A) and/or head unit 129 (shown in FIG. 1B).

Vehicle communication system 217 provides communication pathways that link head unit 201 and peripheral devices 103-125. Arrangement 200 includes programmable interface 203. Interface 203 is connected to communication system 217. Interface 203 is connected to head unit 201 and peripheral devices 103-125 via communication system 217. In some embodiments, interface 203 may be directly connected to head unit 201 and/or one or more of peripheral devices 103-125.

Arrangement 200 shows that interface 203 may establish communication pathway 207 to mobile device 205. Mobile device may not be otherwise connected to communication system 217. Interface 205 may insulate mobile device 205 from accessing communication system 217. Communication pathway 207 may be a wired or wireless connection.

Arrangement 200 shows that mobile device 205 may be linked to remote network 211. Via mobile device 205 and remote network 211, interface may access an information exchange protocol stored on remote network 211. Interface 203 may connect to mobile device 205 when interface 203 detects a presence of mobile device 205.

Arrangement 200 also shows that interface 205 may include communication hardware that allows interface 205 establish communication pathway 213 and connect directly to remote network 215. Interface may access an information exchange protocol stored on remote network 215. Remote network 211 may be linked to remote network 215 via communication pathway 219.

Figure 3:
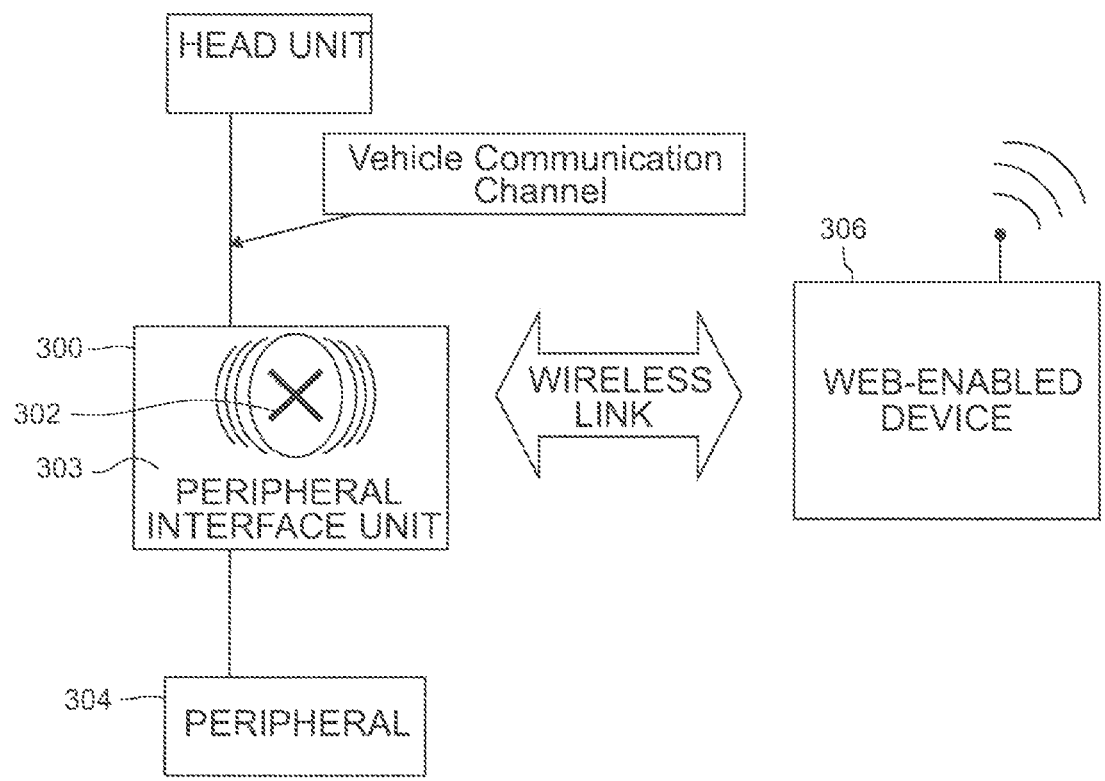
FIG. 3 shows illustrative apparatus in accordance with principles of the disclosure.

FIG. 3 shows illustrative Arrangement A-1 for interface unit 300. Interface unit 300 may include one or more features of interface 203 (shown in FIG. 2). Interface unit 300 may include interface 302. Interface unit 300 may include interface transceiver 303. Interface unit 300 may be placed between, and intercept bit packets that are exchanged between, the head unit and a peripheral, for example, peripheral 304. Interface unit 300 may intercept bit packets transmitted by one or more peripheral using a vehicle communication system, such as communication system 217 (shown in FIG. 2). Interface 302 may translate a packet from the head unit's protocol to the peripheral protocol. Interface 302 may translate a packet from the peripheral's protocol to the head unit's protocol.

Transceiver 303 may be linked, for example, by wireless communication, such as one or more of the implementations listed in Table 3, and any associated hardware, firmware, software and protocols, to web-enabled device 306, which may include a cell phone. An AM device installer may use the web-enabled device, in communication with the interface, to interact with the peripheral.

An AM device installer may use the web-enabled device, in communication with the interface, to identify the OEM protocol and the peripheral protocol and "flash" or download from a remote server a translator into the interface.

Transceiver 303 may harvest charge or current from the web-enabled device to power communication with the web-enabled device. Transceiver 303 may harvest charge or current from the vehicle electrical system to power communication with the web-enabled device.

Interface 300 may harvest charge or current from the web-enabled device to power communication with the web-enabled device. Interface 300 may harvest charge or current from the vehicle electrical system to power communication with the web-enabled device.

Figure 4:
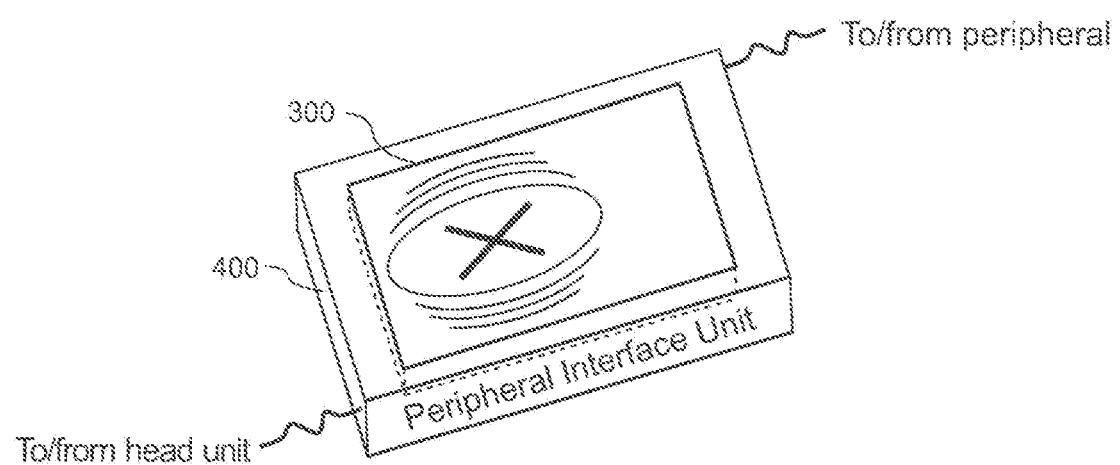
FIG. 4 shows illustrative apparatus in accordance with principles of the disclosure.

FIG. 4 is a perspective view showing interface unit 300 packaged in housing 400. Interface 300 may be situated in housing 400 in such a manner that interface transceiver 303 may be wirelessly engaged by a mobile device such as web-enabled device 306.

Figure 5:
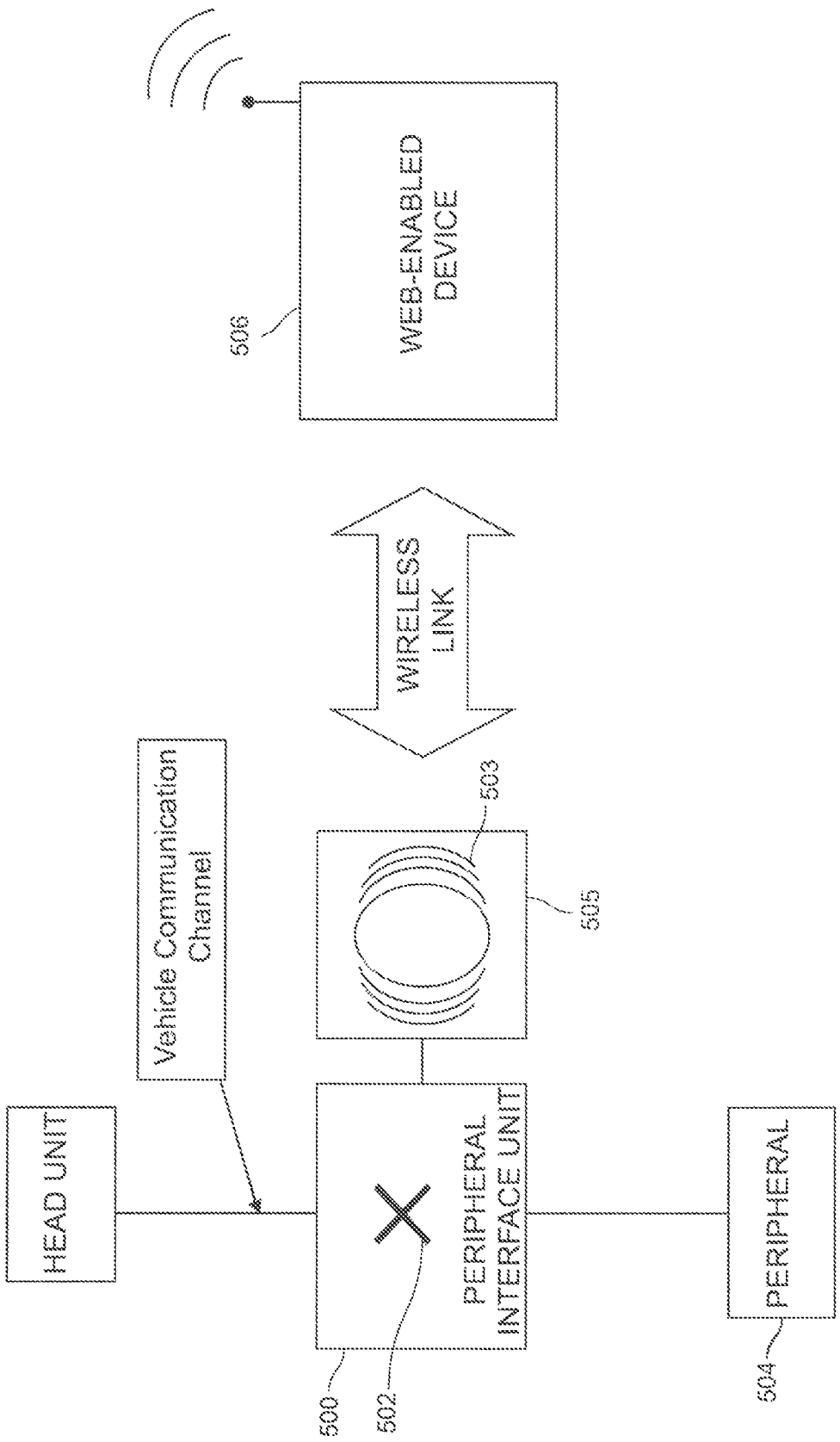
FIG. 5 shows illustrative apparatus in accordance with principles of the disclosure.

FIG. 5 shows illustrative Arrangement A-2 for interface unit 500. Interface unit 500 may include interface 502. Interface transceiver 503 may be disposed in peripheral interface communication unit 505. Communication unit 505 may be removably connected with interface unit 500. Communication unit 505 may be permanently connected with interface unit 500.

Interface unit 500 may be placed between, and intercept bit packets that are exchanged between, the head unit and a peripheral, for example, peripheral 504. Interface 502 may translate a packet from the head unit's protocol to the peripheral protocol. Interface 502 may translate a packet from the peripheral's protocol to the head unit's protocol.

Transceiver 503 may be linked, for example, by wireless communication, such as one or more of the implementations listed in Table 3, and any associated hardware, firmware, software and protocols, to web-enabled device 506, which may include a cell phone. An AM device installer may use the web-enabled device, in communication with the interface, to interact with the peripheral.

An AM device installer may use the web-enabled device, in communication with the interface, to identify the OEM protocol and the peripheral protocol and "flash" or download from a remote server a translator into the interface.

Transceiver 503 may harvest charge or current from the web-enabled device to power communication with the web-enabled device. Transceiver 503 may harvest charge or current from the vehicle electrical system to power communication with the web-enabled device.

Interface 500 may harvest charge or current from the web-enabled device to power communication with the web-enabled device. Interface 500 may harvest charge or current from the vehicle electrical system to power communication with the web-enabled device.

Figure 6:
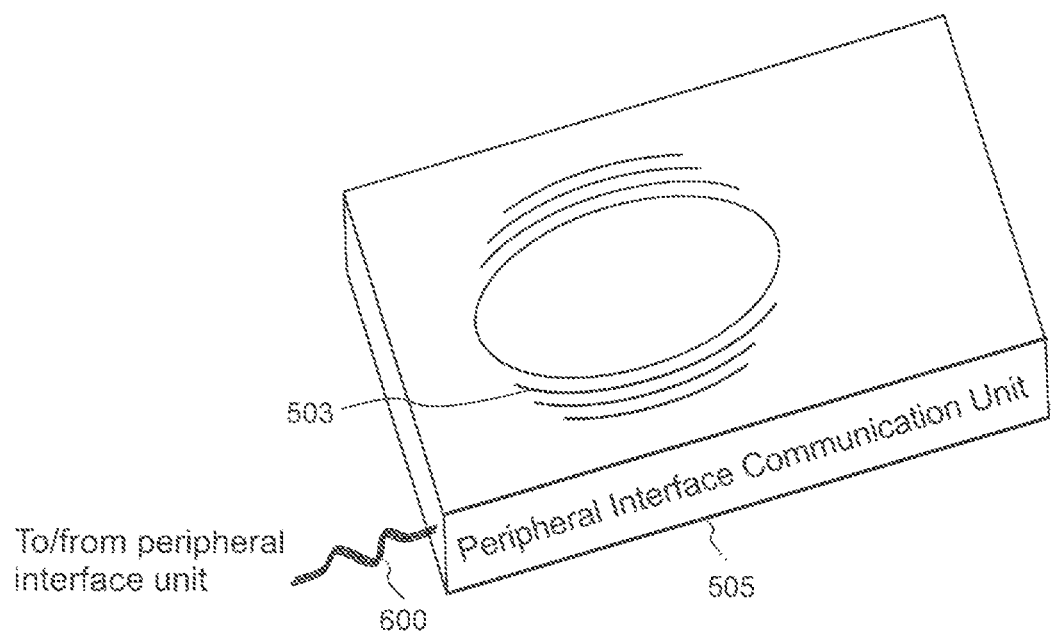
FIG. 6 shows illustrative apparatus in accordance with principles of the disclosure.

FIG. 6 is a perspective view showing transceiver 503 packaged in peripheral interface communication unit 500. Transceiver 503 may be situated in communication unit 500 in such a manner that transceiver 503 may be wirelessly engaged by a mobile device such as web-enabled device 506. Communication line 600 may be removably or permanently connected to a communication port on peripheral interface unit 500.

Figure 7:
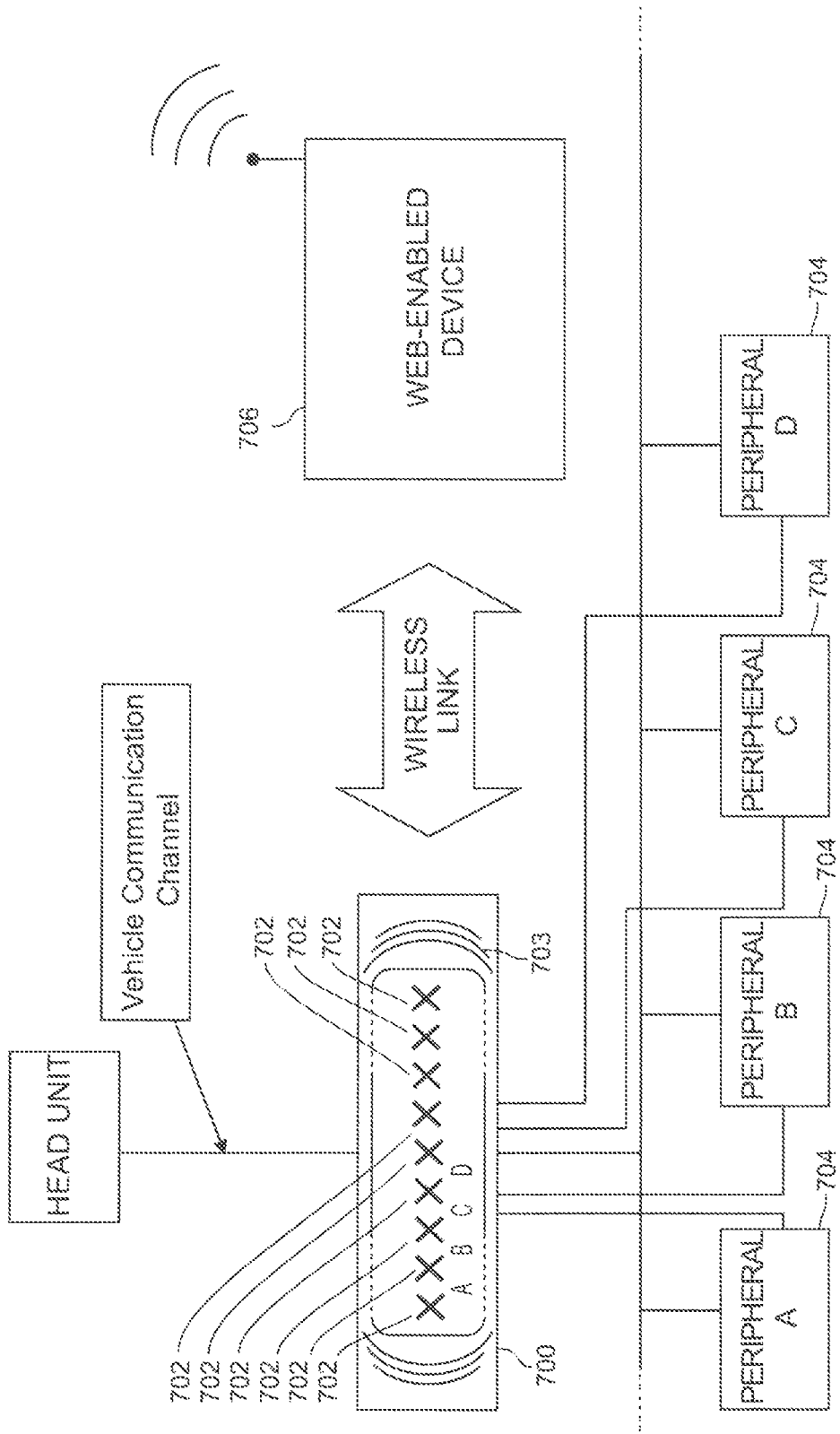
FIG. 7 shows illustrative apparatus in accordance with principles of the disclosure.

FIG. 7 shows illustrative Arrangement B-1 for interface unit 700. Interface unit 700 may include interfaces 702. Each of interfaces 702 may be associated with a communication port that communicates with a peripheral device. Each of interfaces 702 may correspond to a different peripheral. For example, interfaces A, B, C and D may correspond, respectively to peripherals A, B, C and D.

Interface unit 700 may include interface transceiver 703. Interface unit 700 may be placed between, and intercept bit packets that are exchanged between, the head unit and one or more of peripherals 704. Interfaces 702 may translate a packet from the head unit's protocol to a peripheral protocol. Interfaces 702 may translate a packet from a peripheral protocol to the head unit's protocol. Each of interfaces 702 may be associated with a different information exchange protocol. One or more of the information exchange protocols may be obtained via web-enabled device 706.

Transceiver 703 may be linked, for example, by wireless communication, such as one or more of the implementations listed in Table 3, and any associated hardware, firmware, software and protocols, to web-enabled device 706, which may include a cell phone. An AM device installer may use the web-enabled device, in communication with the interface, to interact with one or more of the peripherals.

An AM device installer may use web-enabled device 706, in communication with interface unit 700, to identify the OEM protocol and the peripheral protocol, and "flash" or download from a remote server a translator into interfaces 702 for the corresponding peripheral.

Transceiver 703 may harvest charge or current from the web-enabled device to power communication with the web-enabled device. Transceiver 703 may harvest charge or current from the vehicle electrical system to power communication with the web-enabled device.

Interface unit 700 may harvest charge or current from the web-enabled device to power communication with the web-enabled device. Interface unit 700 may harvest charge or current from the vehicle electrical system to power communication with the web-enabled device.

Figure 8:
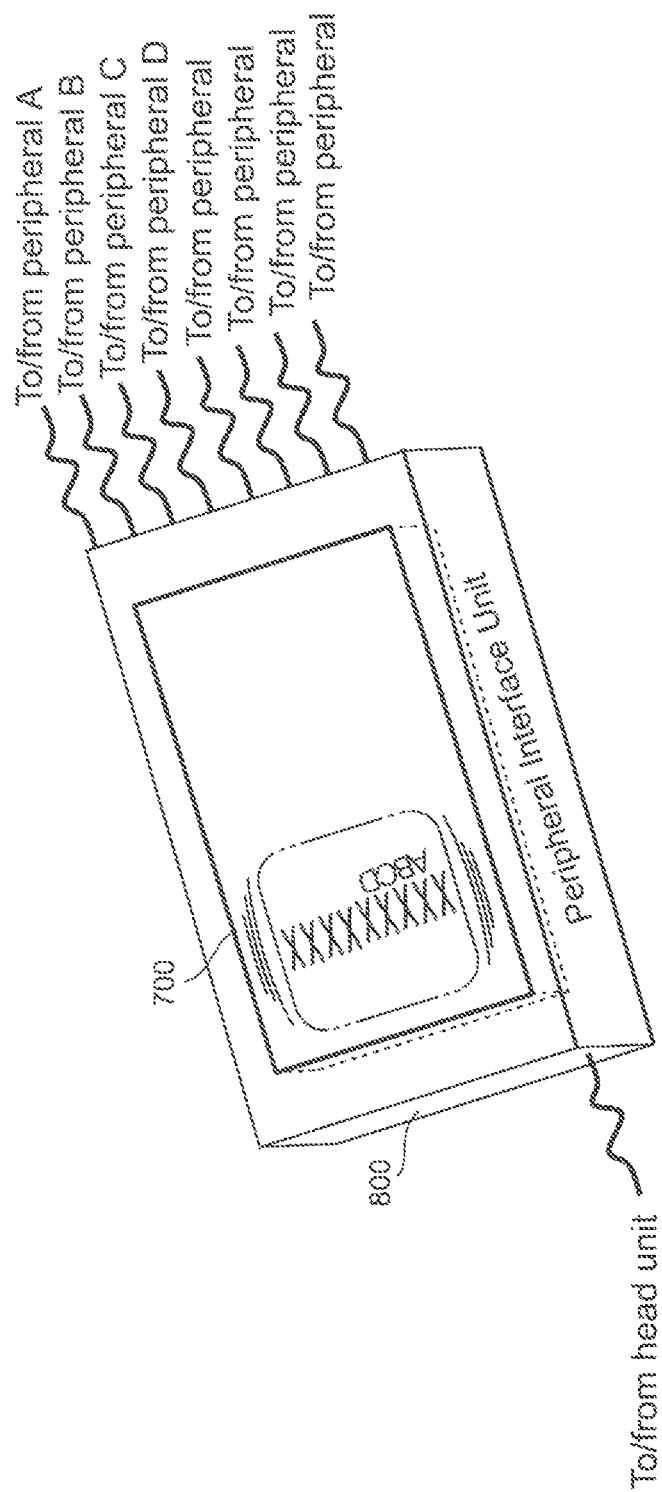
FIG. 8 shows illustrative apparatus in accordance with principles of the disclosure.

FIG. 8 is a perspective view showing interface unit 700 packaged in housing 800. Interface unit 700 may be situated in housing 800 in such a manner that interface transceiver 703 may be wirelessly engaged by a mobile device such as web-enabled device 706. Communication line 800 may be removably or permanently connected to a communication port on peripheral interface unit 700. Communication lines 802 may be removably or permanently connected to communication ports on the peripherals.

Figure 9:
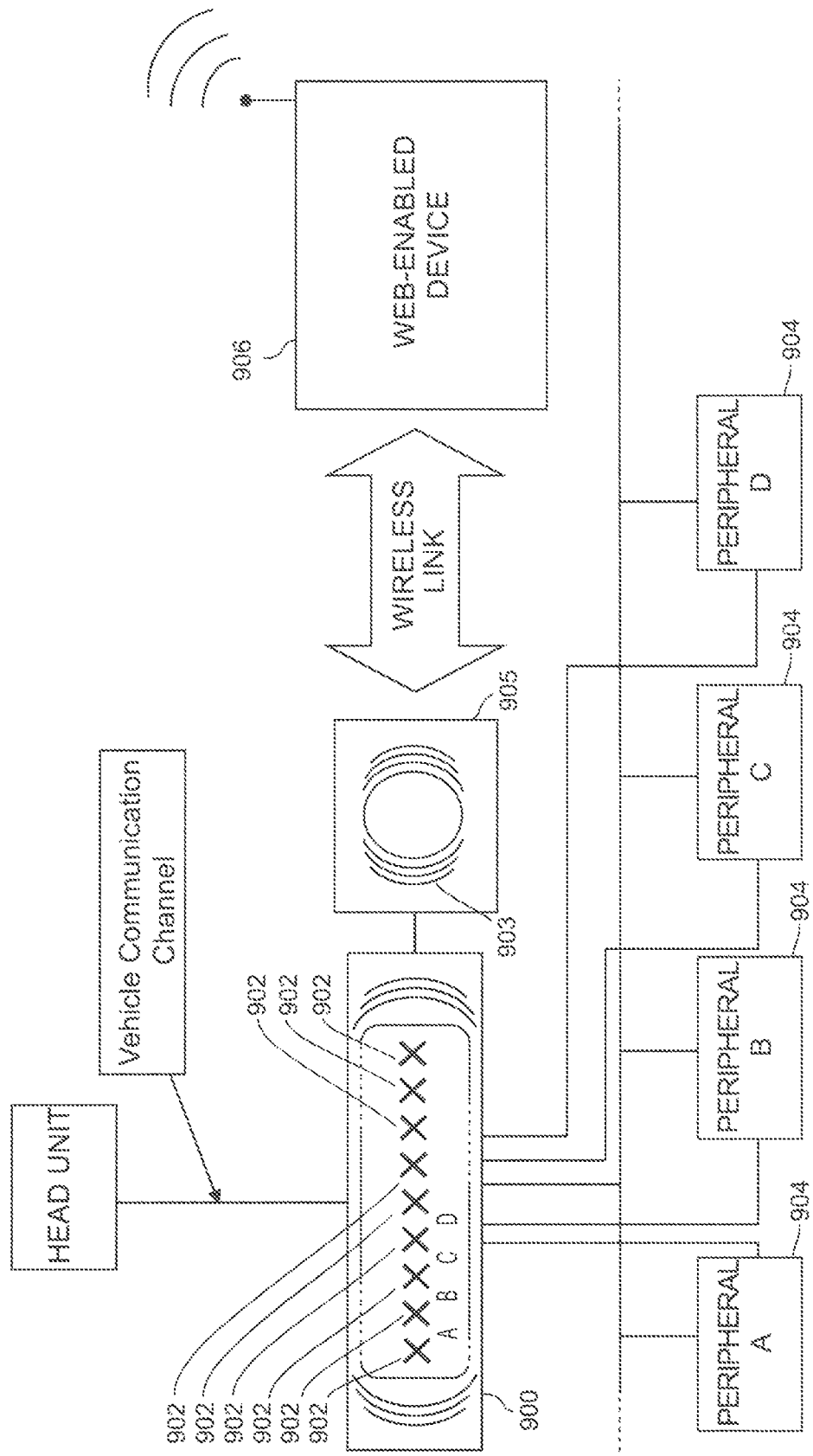
FIG. 9 shows illustrative apparatus in accordance with principles of the disclosure.

FIG. 9 shows illustrative Arrangement B-2 for interface unit 900. Interface unit 900 may include interfaces 902. Interface transceiver 903 may be disposed in peripheral interface communication unit 905. Communication unit 905 may be removably connected with interface unit 900. Communication unit 905 may be permanently connected with interface unit 900.

Interface unit 900 may be placed between, and intercept bit packets that are exchanged between, the head unit and one or more of peripherals 904. Interface 902 may translate a packet from the head unit's protocol to a peripheral protocol. Interface 902 may translate a packet from a peripheral's protocol to the head unit's protocol.

Transceiver 903 may be linked, for example, by wireless communication, such as one or more of the implementations listed in Table 3, and any associated hardware, firmware, software and protocols, to web-enabled device 906, which may include a cell phone. An AM device installer may use the web-enabled device, in communication with the interface, to interact with the one or more of peripherals 904.

An AM device installer may use the web-enabled device, in communication with the interface, to identify the OEM protocols and the peripheral protocols and "flash" or download from a remote server a translator into the interface.

Transceiver 903 may harvest charge or current from the web-enabled device to power communication with the web-enabled device. Transceiver 903 may harvest charge or current from the vehicle electrical system to power communication with the web-enabled device.

Interface 900 may harvest charge or current from the web-enabled device to power communication with the web-enabled device. Interface 900 may harvest charge or current from the vehicle electrical system to power communication with the web-enabled device.

Figure 10:
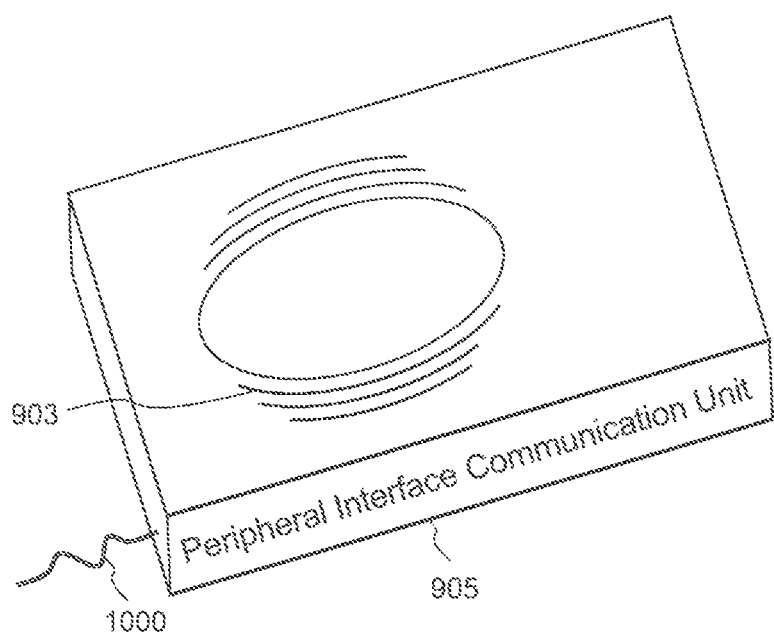
FIG. 10 shows illustrative apparatus in accordance with principles of the disclosure.

FIG. 10 is a perspective view showing transceiver 903 packaged in peripheral interface communication unit 900. Transceiver 903 may be situated in communication unit 900 in such a manner that transceiver 903 may be wirelessly engaged by a mobile device such as web-enabled device 906. Communication line 1000 may be removably or permanently connected to a communication port on peripheral interface unit 900.

Figure 11:
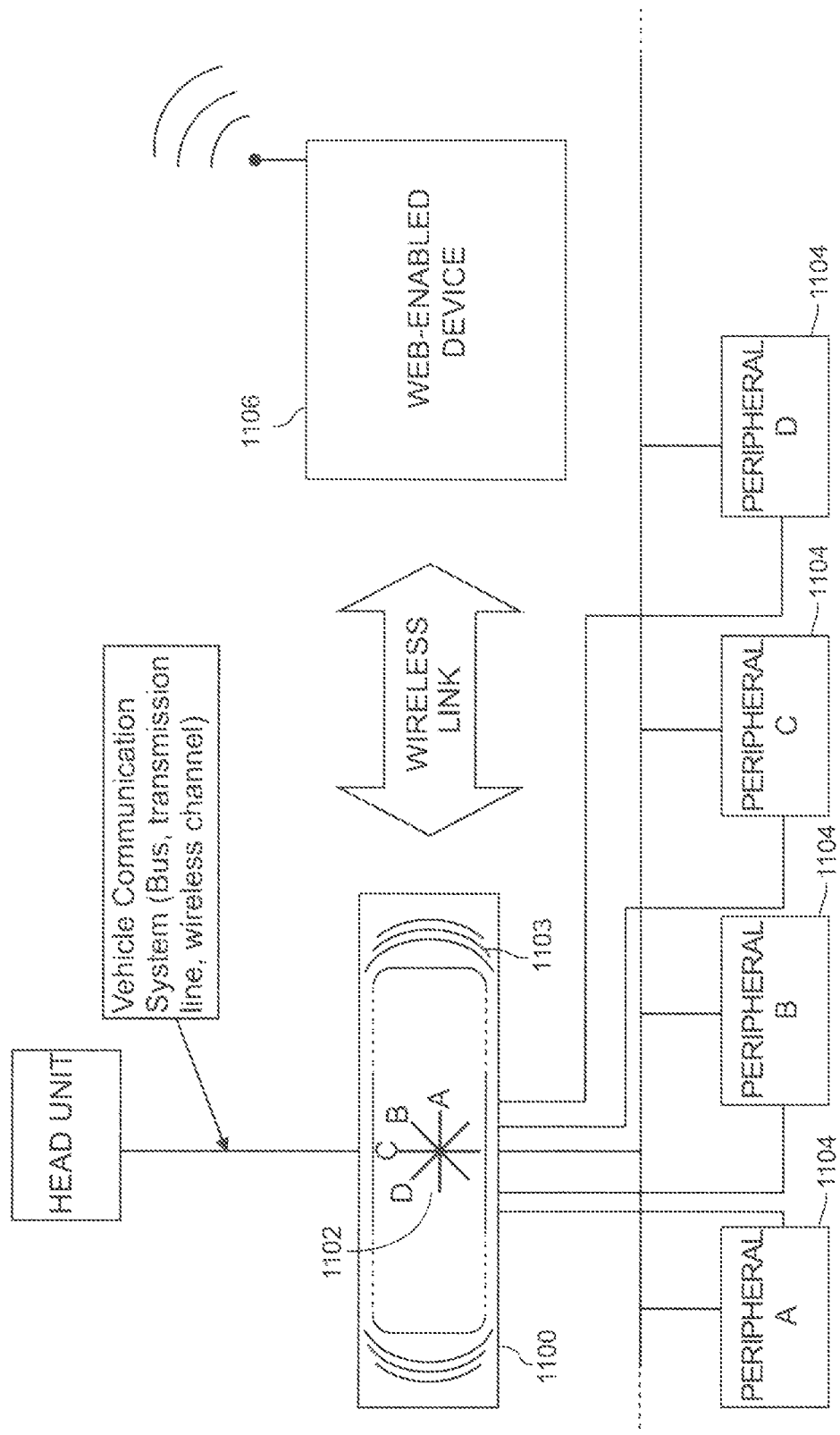
FIG. 11 shows illustrative apparatus in accordance with principles of the disclosure.

FIG. 11 shows illustrative Arrangement C-1 for interface unit 1100. Interface unit 1100 may include multi-device interface 1102. Interface 1102 may be configured to interface with one or more of peripherals 1104. Each of peripherals 1104 may require a protocol that is different from those of the others. Interface 1102 may interface with each of peripherals A, B, C and D.

Interface unit 1100 may include interface transceiver 1103. Interface unit 1100 may be placed between, and intercept bit packets that are exchanged between, the head unit and one or more of peripherals 1104. Interface 1102 may translate a packet from the head unit's protocol to a peripheral protocol. Interface 1102 may translate a packet from a peripheral protocol to the head unit's protocol.

Transceiver 1103 may be linked, for example, by wireless communication, such as one or more of the implementations listed in Table 3, and any associated hardware, firmware, software and protocols, to web-enabled device 1106, which may include a cell phone. An AM device installer may use the web-enabled device, in communication with the interface, to interact with one or more of the peripherals.

An AM device installer may use the web-enabled device, in communication with the interface, to identify the OEM protocol and the peripheral protocol, and "flash" or download from a remote server a translator into the interface for the corresponding peripheral.

Transceiver 1103 may harvest charge or current from the web-enabled device to power communication with the web-enabled device. Transceiver 1103 may harvest charge or current from the vehicle electrical system to power communication with the web-enabled device.

Interface 1100 may harvest charge or current from the web-enabled device to power communication with the web-enabled device. Interface 1100 may harvest charge or current from the vehicle electrical system to power communication with the web-enabled device.

Figure 12:
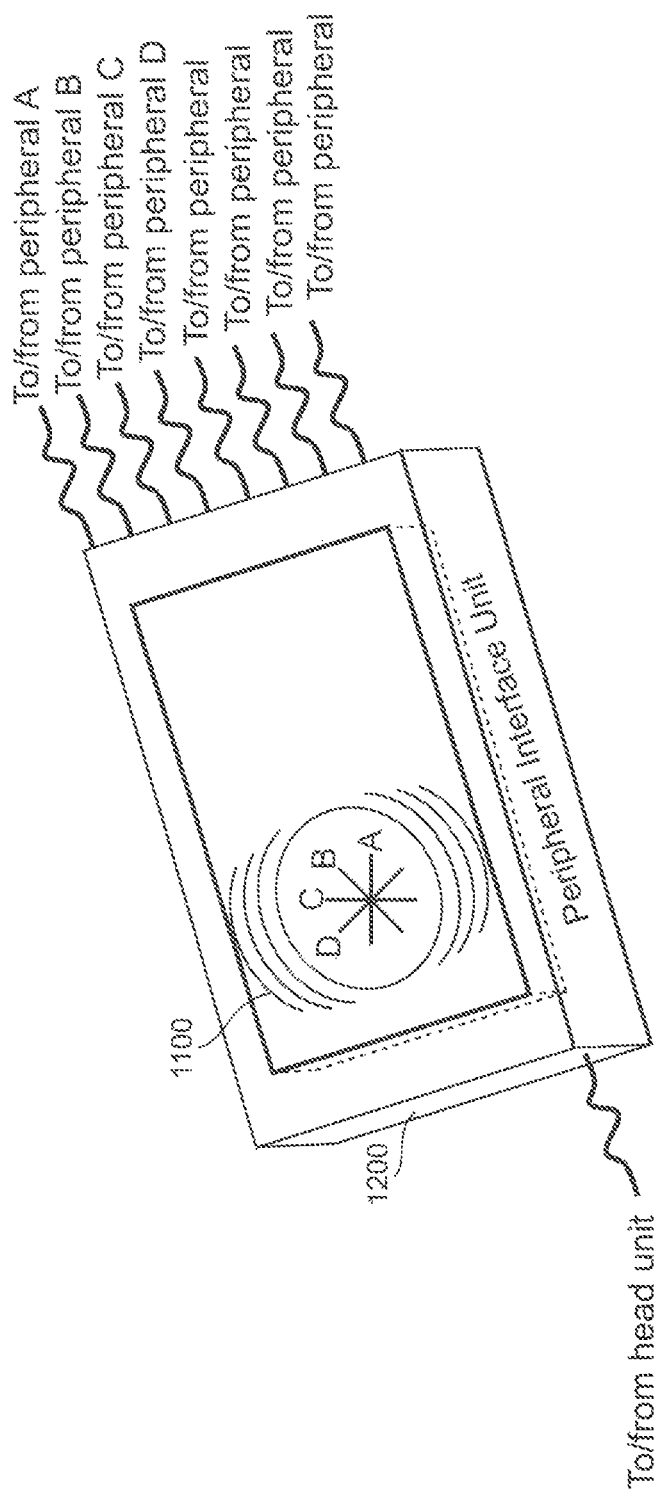
FIG. 12 shows illustrative apparatus in accordance with principles of the disclosure.

FIG. 12 is a perspective view showing interface unit 1100 packaged in housing 1200. Interface 1100 may be situated in housing 1200 in such a manner that interface transceiver 1103 may be wirelessly engaged by a mobile device such as web-enabled device 1106. Communication line 1200 may be removably or permanently connected to a communication port on peripheral interface unit 1100. Communication lines 1202 may be removably or permanently connected to communication ports on the peripherals.

Figure 13:
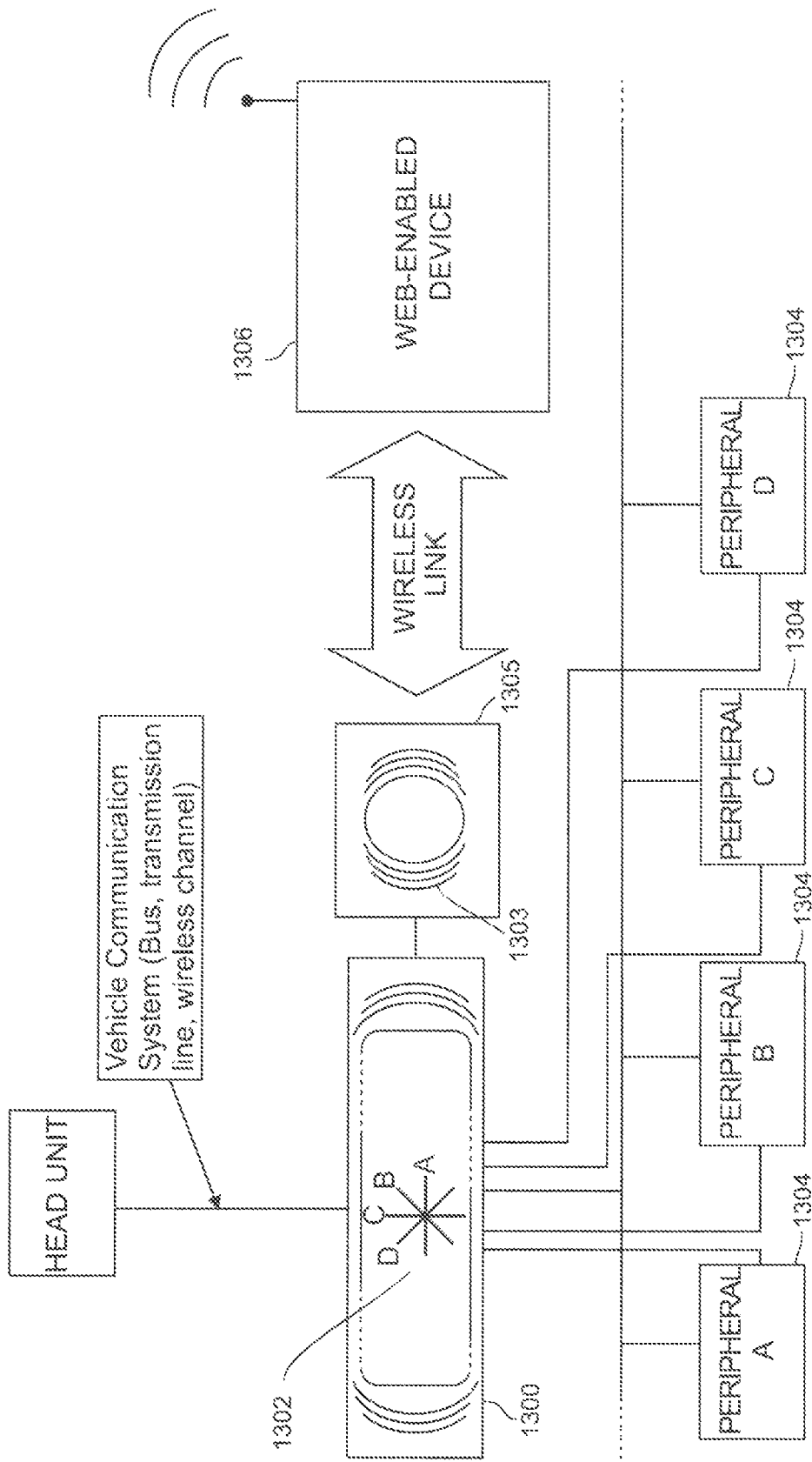
FIG. 13 shows illustrative apparatus in accordance with principles of the disclosure.

FIG. 13 shows illustrative Arrangement C-2 for interface unit 1300. Interface unit 1300 may include multi-device interface 1302. Interface transceiver 1303 may be disposed in peripheral interface communication unit 1305. Communication unit 1305 may be removably connected with interface unit 1300. Communication unit 1305 may be permanently connected with interface unit 1300.

Interface unit 1300 may be placed between, and intercept bit packets that are exchanged between, the head unit and one or more of peripherals 1304. Interface 1302 may translate a packet from the head unit's protocol to a peripheral protocol. Interface 1302 may translate a packet from a peripheral's protocol to the head unit's protocol.

Transceiver 1303 may be linked, for example, by wireless communication, such as one or more of the implementations listed in Table 3, and any associated hardware, firmware, software and protocols, to web-enabled device 1306, which may include a cell phone. An AM device installer may use the web-enabled device, in communication with the interface, to interact with the one or more of peripherals 1304.

An AM device installer may use the web-enabled device, in communication with the interface, to identify the OEM protocol and the peripheral protocol and "flash" or download from a remote server a translator into the interface.

Transceiver 1303 may harvest charge or current from the web-enabled device to power communication with the web-enabled device. Transceiver 1303 may harvest charge or current from the vehicle electrical system to power communication with the web-enabled device.

Interface 1300 may harvest charge or current from the web-enabled device to power communication with the web-enabled device. Interface 1300 may harvest charge or current from the vehicle electrical system to power communication with the web-enabled device.

Figure 14:
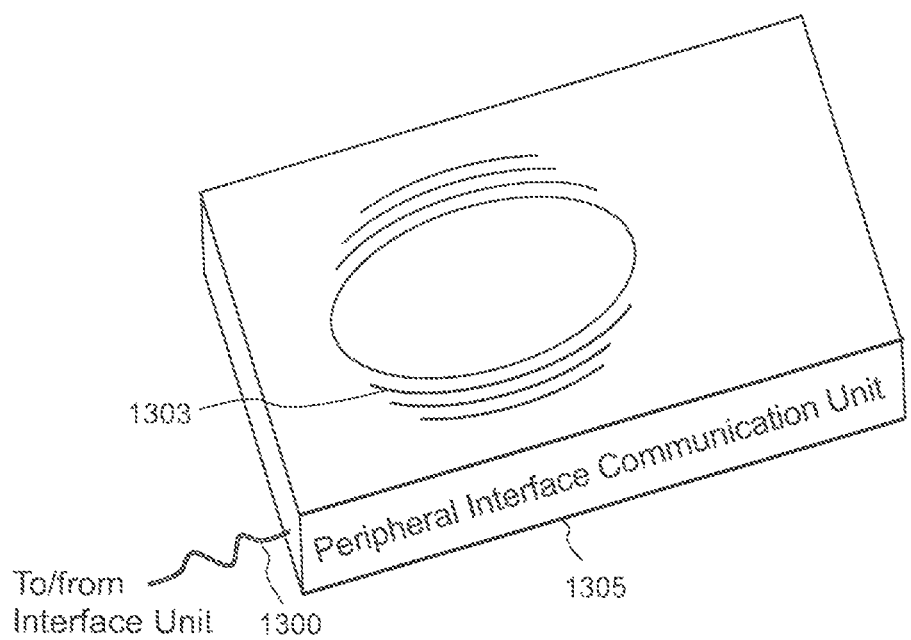
FIG. 14 shows illustrative apparatus in accordance with principles of the disclosure.

FIG. 14 is a perspective view showing transceiver 1303 packaged in peripheral interface communication unit 1305. Transceiver 1303 may be situated in communication unit 1305 in such a manner that transceiver 1303 may be wirelessly engaged by a mobile device such as web-enabled device 1306. Communication line 1400 may be removably or permanently connected to a communication port on peripheral interface unit 1300.

Figure 15:
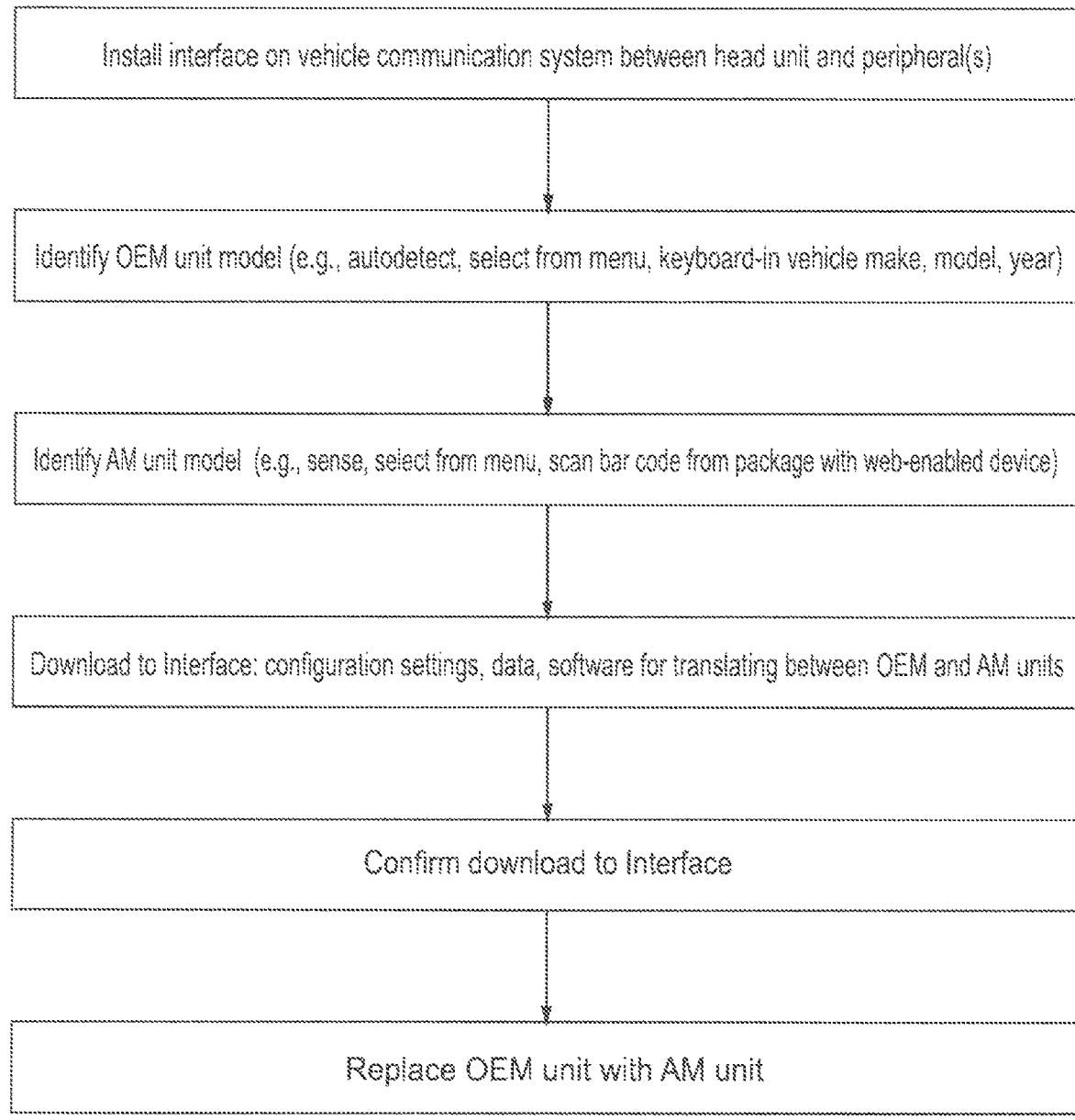
FIG. 15 shows an illustrative process in accordance with principles of the disclosure.

FIG. 15 shows illustrative steps that may be performed in accordance with the principles of the disclosure.

Figure 16:
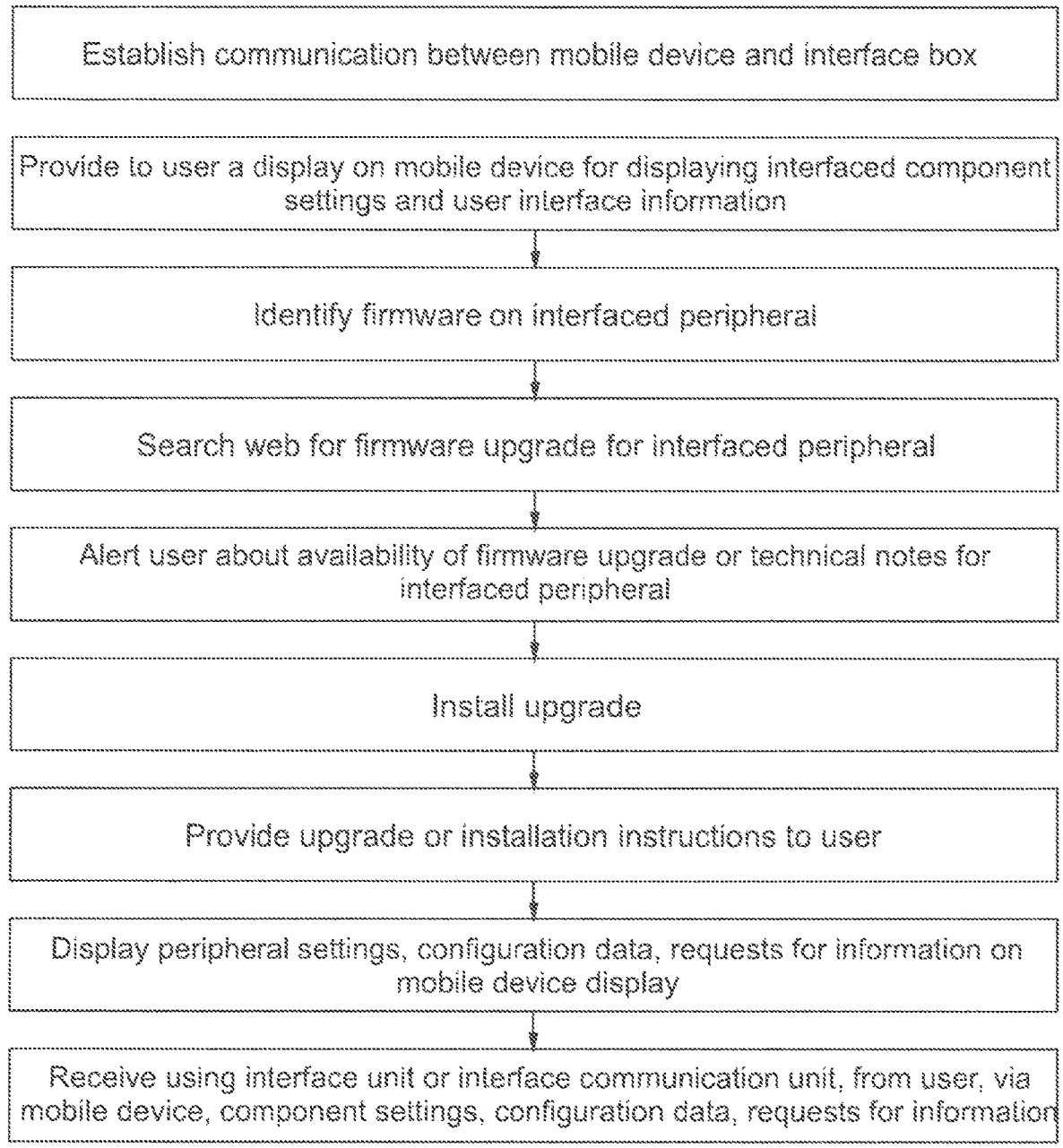
FIG. 16 shows illustrative apparatus in accordance with principles of the disclosure.

FIG. 16 shows other illustrative steps that may be may be performed in accordance with the principles of the disclosure. One or more of the steps of FIGS. 15 and 16 may be combined with each other or with other steps in accordance of the principles of the disclosure. One or more of the steps may be omitted from the processes shown in FIGS. 15 and 16.

Thus, apparatus and methods for wireless configuration and programming of automotive aftermarket peripheral interfacing modules are provided. Persons skilled in the art will appreciate that the present disclosure can be practiced by other than the described embodiments, which are presented for purposes of illustration rather than of limitation. The present disclosure is limited only by the claims that follow.

The invention claimed is:

1. A system for communicating with at least one device or at least one sensor in a vehicle, the system comprising:
   a programmable interface configured to bridge incompatibility of a radio head unit configured to communicate using a first communication protocol and a dedicated peripheral processor configured to communication using a second communication protocol incompatible with the first communication protocol and allow the radio head unit to control the dedicated peripheral processor using a vehicle communication system, the programmable interface comprising:
   a first communication port for communicating with the radio head unit;
   a second communication port for communicating with the dedicated peripheral processor; and
   a third communication port for communicating with a mobile device outside the vehicle or not installed in the vehicle;
   wherein the programmable interface is configured to bridge the incompatibility without pre-programming the interface prior to installation in the vehicle, and
   wherein the programmable interface is configured to bridge the incompatibility by, after being installed in the vehicle:
   using the first communication port, identify the first communication protocol used by the radio head unit;

using the second communication port, identify the second communication protocol used by the dedicated peripheral processor;
using the third communication port, detect a presence of the mobile device;
in response to detecting the mobile device, via the mobile device, accessing a remote network external to the vehicle and thereby obtain a target information exchange protocol stored on the remote network; and
utilizing the target information exchange protocol to bridge the incompatibility.

2. The communication system of claim 1 wherein, the programmable interface is configured to:
intercept information transmitted by the dedicated peripheral processor in the second communication protocol;
translate the intercepted information transmitted by the dedicated peripheral processor into the first protocol; and
push the information reformatted in the first communication protocol onto the vehicle communication system.

3. The communication system of claim 1 wherein, the programmable interface is configured to:
intercept information transmitted by the radio head unit in the first communication protocol;
translate the intercepted information transmitted by the radio head unit into the second protocol; and
push the information reformatted in the second communication onto the vehicle communication system.

4. The communication system of claim 1 wherein the programmable interface is configured to communicate with the mobile device outside the vehicle using a wired or a wireless communication channel.

5. The communication system of claim 1 wherein the programmable interface is configured to harvest power from a battery of the vehicle to communicate with the mobile device.

6. The communication system of claim 1 wherein the programmable interface is configured to harvest power from the mobile device to communicate with the mobile device.

7. The communication system of claim 1 wherein the radio head unit is an aftermarket head unit.

8. The communication system of claim 1 wherein the radio head unit is an original equipment manufacturer radio head unit and the dedicated peripheral processor is embedded in an aftermarket component installed in the vehicle.

9. The communication system of claim 1 wherein the vehicle communication system comprises a system bus or a non-bus communication system channel.

10. A system for communicating with at least one device or at least one sensor in a vehicle, the system comprising:
a dynamically programmable interface comprising:
a first communication port for intercepting the data generated by a radio head unit, the radio head unit configured to communicate using a first communication protocol;
a second communication port for intercepting the data generated by a dedicated peripheral processor, the dedicated peripheral processor configured to communicate using a second communication protocol incompatible with the first communication protocol; and
an interface transceiver for accessing a communication network otherwise external to the vehicle and obtaining a target information exchange protocol;
wherein the target information exchange protocol when executed by the dynamically programmable interface is configured to bridge incompatibility of the radio head unit and dedicated peripheral processor by translating:
intercepted data generated by the radio head unit into the second communication protocol; and
intercepted data generated by the dedicated peripheral processor into the first communication protocol.

11. The system of claim 10 wherein:
the dedicated peripheral processor is one of a plurality of dedicated peripheral processors;
the second communication protocol is one of a plurality of communication protocols that are each incompatible with the first communication protocol;
the target information exchange protocol is one of a plurality of target information exchange protocols; and
the dynamic programmable interface is configured to obtain, from one or more networks external to the vehicle, the plurality of target information exchange protocols such that the dynamic programmable interface dynamically self-configures to translate:
data generated by any one of the plurality of dedicated peripheral processors into the first communication protocol utilized by the radio head unit; and
data generated by the radio head unit into any one of the plurality of second communication protocols.

12. The system of claim 10 wherein the dynamically programmable interface is configured to:
detect removal of the dedicated peripheral processor from the vehicle; and
in response to detecting the removal, delete the target information exchange protocol associated with the removed dedicated peripheral processor.

13. The system of claim 10 wherein the dynamically programmable interface further comprises a third communication port for accessing a mobile device outside the vehicle.

14. The system of claim 13 wherein the dynamically programmable interface is configured to harvest charge or current from the mobile device to access to a communication network otherwise external to the vehicle.

15. The system of claim 13 wherein the dynamically programmable interface is configured to harvest charge or current from the mobile device to query the dedicated peripheral processor and identify the second communication protocol.

16. The system of claim 10 the dynamically programmable interface is configured to harvest charge or current from an electrical system of the vehicle to power access to the communication network otherwise external to the vehicle.

17. The system of claim 10 wherein the interface transceiver is removable from the dynamic programmable interface.

* * * * *